United States Patent [19]
Dicker

[11] 3,768,435
[45] Oct. 30, 1973

[54] FOOTBALL YARDAGE MEASURING DEVICE

[76] Inventor: George L. Dicker, 17938 Irvine Blvd., Tustin, Calif. 92680

[22] Filed: May 12, 1972

[21] Appl. No.: 252,598

Related U.S. Application Data

[63] Continuation-in-part of Ser. No. 87,531, Nov. 6, 1970, abandoned.

[52] U.S. Cl............... 116/114 R, 33/18 R, 33/289, 40/125 J
[51] Int. Cl. .......................................... G01d 21/00
[58] Field of Search............................ 116/114, 135; 33/18 R, 32 B, 32 C, 289, 158; 40/125 J

[56] References Cited
UNITED STATES PATENTS

| | | | |
|---|---|---|---|
| 2,384,150 | 9/1945 | Balmer | 33/125 |
| 2,064,745 | 12/1936 | Harrie | 40/125 J |
| 2,795,853 | 6/1957 | Benfield et al. | 40/125 J |
| 3,181,241 | 5/1965 | Middleton | 33/289 |
| 3,678,592 | 7/1972 | Williamson | 33/289 |

FOREIGN PATENTS OR APPLICATIONS

| 9,507 | 1905 | Great Britain | 33/158 |
|---|---|---|---|

*Primary Examiner*—Louis J. Capozi

[57] ABSTRACT

A football yardage measuring device and method for using same. The device includes an elongate rod of sufficient length to reach a football from one of the plural established yardage lines on the football field regardless of where said football is on the football field, a reference marker and a slideable measuring pointer mounted on said rod to enable accurate distance measurement between a football and a yardage line by one individual, and a visual indicator attached to one end of said rod to present a clear indication of the point to which the football must be advanced for a first down when said rod is placed in a vertical position at said point.

11 Claims, 12 Drawing Figures

PATENTED OCT 30 1973 3,768,435

INVENTOR.
GEORGE L. DICKER

BY
FOWLER, KNOBBE
& MARTENS
ATTORNEYS.

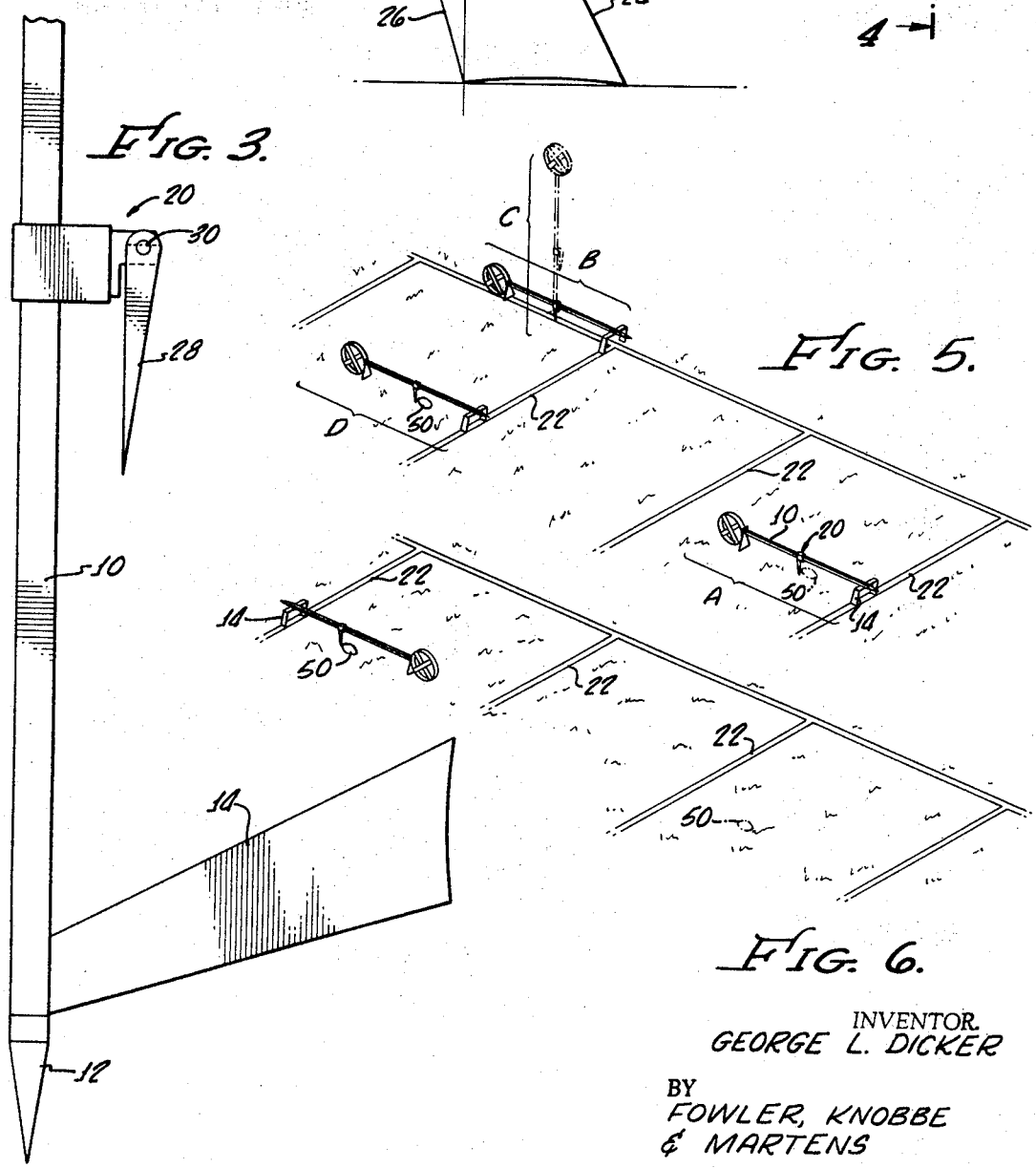

FOOTBALL YARDAGE MEASURING DEVICE

RELATED APPLICATION

This application is a continuation-in-part of copending application Ser. No. 87,531, filed Nov. 6, 1970 entitled FOOTBALL YARDAGE MEASURING DEVICE, now abandoned.

BACKGROUND OF THE INVENTION

This invention is in the field of athletic equipment and, more particularly, it is concerned with the measurement of the ten yard distance required in football games for the achievement of a first down, and the accomplishment of this measurement by one person.

The prevalent practice for measuring first down yardage in football games is the use of two elongate rods, one end of each rod connected to one end of a 10 yard length of chain. This device is used by placing one of the rods vertically at the position at which the football is placed at the beginning of play. The other rod is positioned by stretching the chain, so that the second rod is 10 yards down field from the first rod and, when placed vertically at that point, marks the position to which the ball must be moved for a first down, known as the line to gain point. If the chain must be carried to the center of the field to measure the position of the football and, thereby, determine whether a first down has been achieved, it has been the practice to hold the chain at the point where it crosses an established yardage line, so that the chain with its associated rods may be properly placed on the field by replacing the held portion of the chain on the same established yardage line on the playing field near the football. In order to use the chain, it has been common to employ one individual to handle each of the rods at the end of the chain and to employ a third man to properly position the held portion of the chain on the established yardage line during measurements. It was therefore necessary to have two people handling the device at all times with the assistance of the third person, such as a head linesman, when measurements were made in the center of the field.

Likewise the chain has caused many injuries to players. Since the position of the vertical rods is the only record kept of the position to which the ball must be advanced for a first down, if the rods get in the way of players running from the field during play, the rods are allowed to fall in place. If a player falls into one of the rods, he may be seriously injured.

Notwithstanding the variety of drawbacks of the chain, it has been used for many years due to the lack of an accurate and safe replacement device.

SUMMARY OF THE INVENTION

The present invention, on the other hand, is a measuring device which measures the position of a football from the nearest established yardage line when play is begun. The device establishes the distance between the football and this yardage line and enables the person utilizing the device to move the device down the field ten yards, so that the line-to-gain may be located from a second established yardage line 10 yards down field. Therefore, utilizing the accurately spaced established yardage lines, the device will determine the location on the field which is 10 yards beyond the point where play is begun, thereby, indicating the line to gain point. Since the device is unitary, including no long, highly flexible members such as the chain of the normal measuring device, it is conveniently handled and operated by one person without sacrificing the accuracy required in such measurements.

Likewise the device may be moved away from the playing field while maintaining a record of the line to gain point. Thus, when players approach the sideline where the device is placed, the operator can pick up the device and run from the approaching players, leaving no obstacles behind which can cause injury.

Because the device includes a visual indicator at one end, the device is used as a line to gain indicator on the sideline when no measurements are being made. This not only eliminates the need for an extra piece of equipment to use as a line to gain indicator, but also eliminates the need for an additional individual to operate such an additional piece of equipment, for one individual executes both the measuring function and the indicator function with this one device.

This device may also be utilized to re-establish yardage lines which become obliterated as a result of the play of the game and inclement weather.

The details of the device utilized in the present invention, as well as the method in which this device is used, is best understood through a detailed description of the preferred embodiment which is shown in the drawings in which:

FIG. 2 is a detailed elevation view of the pointer end of the device showing two positions of the measuring pointer when the device is in the horizontal position;

FIG. 3 is a detailed view of the pointer end of the device showing the position of the measuring pointer when the device is in the erect position;

FIG. 5 is a perspective view of a football playing field, showing the device horizontally positioned above a football and erect at the sidelines to detail the method for using the device;

FIG. 6 is a view similar to that of FIG. 5 but showing the measurement to the football from an alternate yardage marking line;

DETAILED DESCRIPTION OF THE PREFERRED EMBODIMENT

Figure 1:
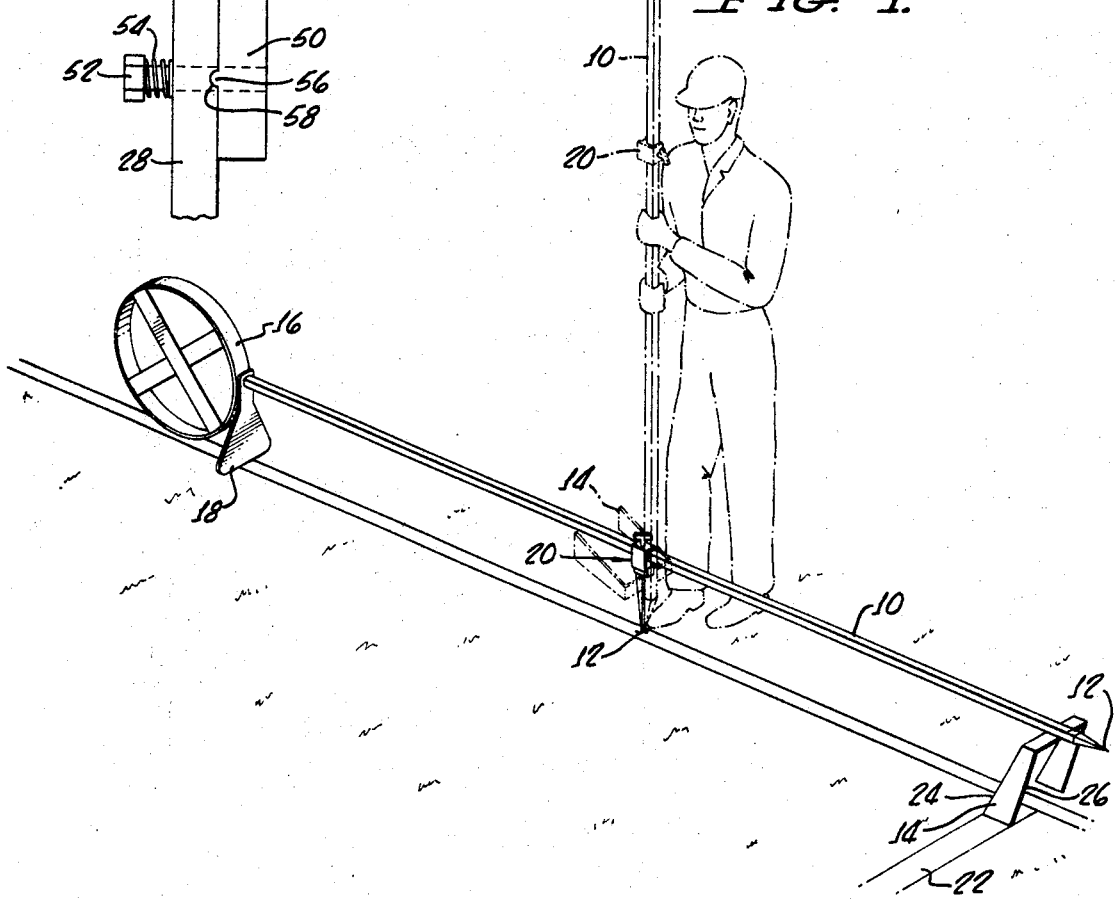
FIG. 1 is a perspective view of the overall apparatus in its horizontal position, with the erect or vertical position shown in dashed lines.

Referring first to FIG. 1, the apparatus of the present invention can be seen to include an elongate rod or member 10 which is preferably made from lightweight material such as extruded aluminum or may be made from a semi-flexible material such as hard rubber polyester, or fibre glass. One end of this rod 10 is pointed at 12 to allow it to be pushed into the playing field when the rod is in the erect position, thereby marking the position of the rod and making the rod semi-self-supporting in the erect or vertical position. This end 12 of the rod 10 is firmly attached to a U-shaped supporting bracket or stationary marker 14, which, in addition to supporting this end 12 of the rod 10 when the rod is horizontal, functions as a reference marker, as will be described below. The other end of the rod 10 is firmly attached to both a visual indicator 16 and a standard 18. The standard 18 is designed to maintain this end of the rod 10 at substantially the same height as the pointed end 12 of the rod 10 when the rod 10 is in the horizontal position. The visual indicator 16 is used to make the position of the rod highly visible to fans and players when the rod is in the erect position. The inclusion of a visual indicator as part of the invention is an important feature in that the need for a separate indicator of the point to which the football must be advanced to achieve a first down, known as the line to gain point, is unnecessary and, therefore, eliminates the need for the use of an additional individual normally required. The present invention enables one individual not only to make the necessary measurements with the rod in the horizontal position as shown by the solid lines in FIG. 1, but also to clearly show to the game officials and players the line to gain point by holding the rod in a vertical direction at a corresponding point on the sideline as shown by the dashed lines in FIG. 1.

The rod 10 additionally supports a sliding measuring pointer or marker 20. The position of this pointer 20 along the rod 10 is adjustable, so that the distance between the pointer 20 and the U-shaped supporting bracket 14 may be precisely set. This distance is used as a first down yardage measuring scale, as will be explained below.

It can be seen in FIG. 1 that the feet of the U-shaped bracket 14 are made to have the same width as a yardage line 22 which is placed on the football field. This yardage line 22 is typically drawn on the field with the use of powdered lime and has a width of approximately 4 inches. The U-shaped bracket foot is therefore typically 4 inches wide so that when it is placed above the yardage line 22 it may be accurately located over the line with the leading edge 24 and the trailing edge 26 of the bracket 14 aligned with the leading and trailing edges of the yardage line 22. In this way measurements made from the established yardage line 22 may be made as accurately as possible. If the width of the line varies, the U-shaped bracket may be placed on the line with the trailing edge 26 on the edge of the yardage line furthest from the line-to-gain point.

Referring now to FIG. 2, it can be seen that the pointer 20 can be adjustably positioned along the elongate rod 10. By way of example, two positions are shown, the first being a position shown in full lines separated by some distance from the U-shaped supporting bracket 14, and the second position shown in dashed lines being the extreme position at which a pointer leg 28 of the pointer 20 is aligned with the trailing edge 26 of the U-shaped supporting bracket. It can be seen that the leading edge 26 of the legs of the U-shaped supporting bracket 14 preferably lie at an acute angle from the rod 10, so that the pointer 20 may be placed in an extreme position as shown in dashed lines in FIG. 2, thereby aligning the pointer leg 28 of the pointer 20 with the bottom of the trailing edge 26 of the bracket 14. This alignment allows measurement to a football which lies partially over the yardage line 22, as will be more completely described with reference to FIGS. 5 and 6.

It can be seen in FIG. 2 that the pointer leg 28 is pivotally mounted about a pivot pin 52 relative the pointer 20. This enables the pointer leg 28 to be rotated to a position shown in FIG. 3, so that, when the rod is in the erect position, the pointer 28 will not present a dangerous protrusion from the device during play.

Figure 4:
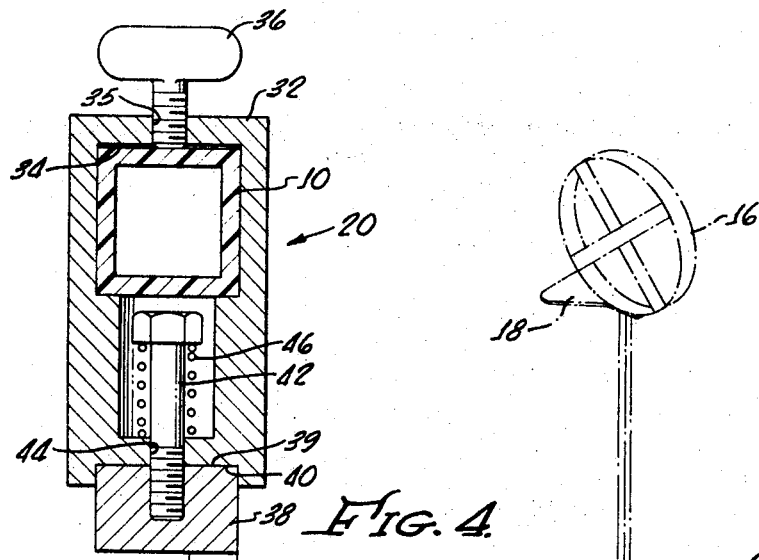
FIG. 4 is a sectional view taken along line 4—4 in FIG. 2 and showing the detailed structure of the measuring pointer.

Referring now to FIG. 4, the details of the pointer 20 and the pointer leg 28 may be explained. This pointer 20 comprises an essentially rectangular housing 32 having an essentially square opening 34 which is slightly larger than the outer dimensions of the rod 10 for slideably receiving the rod 10. As seen in FIG. 4, the rod 10 is preferably a hollow square tube. The housing 32 has a tapped hole 35 to receive a threaded stop or bolt 36 which, when threaded into engagement with the rod 10, will maintain a preset position of the pointer 20 along the rod 10.

A pointer leg supporting block 38 fits within a recess 40 on the lower side of the housing 32. The upper surface 39 of this block 38 is preferably rectangular in shape, and the recess 40 is preferably a matching rectangle, so that the upper surface 39 of the block 38 will fit in either one of two positions within the recess 40. In order to accomplish rotation between these positions, the block 38 is attached to a bolt 42 which is rotatably adjusted in an opening 44 at the bottom of the housing 32 adjacent the recess 40. The bolt 42 is biased by a spring 46 which bears against the bolt 42 and the housing 32 to maintain the block 38 within the recess 40. In order to rotate the block 38 and bolt 42 within the opening 44, it is necessary for the operator to pull the block 38 and its attached bolt 42 away from the housing 32 to rotate the block 38. By then allowing the bias of the spring 46 to bring the block 38 back into the recess 40 after the block 38 has been rotated 180°, the direction of the vertical measuring edge 48 of the pointer leg 28 (as seen in FIG. 2) is reversed. This reversal allows an accurate measurement to be made by adjusting the pointer 20 and its associated pointer leg 28 against a football on either side of the pointer 20. Thus, if the football is between the pointer 20 and the U-shaped bracket 14, the pointer leg 28 will be positioned as shown in FIG. 2, so that the vertical measuring edge 48 may be positioned against one end of the football for accurate placement of the pointer 20 along the rod 10. If on the other hand, the football is between the pointer 20 and the standard 18, the pointer leg 28 is rotated about the opening 44 so that the vertical measuring edge 48 faces the standard 18.

Referring again to FIG. 4, the pointer leg 28 is rotatably mounted on an extension 51 of the block 38 by means of a pin 52 which is secured within the extension 51. The pointer leg 28 is biased against the extension 51 by a spring 54. A protrusion 56 on the surface of the extension 51 fits within a detent 58 on the surface of the pointer leg 28 when the pointer leg 28 is in the position shown in FIG. 2, and fits within a similar detent (not shown) when the pointer leg 28 is in the position shown in FIG. 3. The spring 54 will therefore allow the pointer leg 28 to rotate about the pin 52 and will maintain the pointer leg 28 in the position shown in either FIG. 2 or FIG. 3 by interlocking the protrusion 56 with one of the detents.

Referring now to FIGS. 5 and 6, the method for using the disclosed apparatus will be explained.

Referring first to FIG. 5, a football 50 is shown in dashed lines at its position at the beginning of play and in full lines at the position to which it must be advanced to achieve a first down, that is, ten yards down field from the position shown in dashed lines or the line to gain point. As can be seen, the football field is marked by established yardage lines 22 which are typically spaced at distances of five yards. Therefore, in order to accurately determine the position of the ball 50 shown in full lines, the device is initially placed in the position A of FIG. 5. The U-shaped bracket 14 is aligned with the nearest yardage line 22 and the pointer 20 is adjusted along the rod 10, so that the leading edge of the football 50 just touches the measuring edge 48 (FIG. 2) of the pointer leg 28 of the pointer 20.

Since the football 50 is nearest a yardage line 22 which lies in the opposite direction along the field from the direction in which the ball is to be moved, the measuring edge 48 of the pointer leg 28 is rotated, as explained in reference to FIG. 4, so that it faces the U-shaped bracket 14 and may therefore be positioned against the leading edge of the football 50. The threaded stop 36 is then tightened so that the distance between the bracket 14 and the pointer 20 is accurately recorded. The operator now moves the device to position B shown in FIG. 5 which is also the position shown in dashed lines in FIG. 1. He aligns the U-shaped bracket 14 along the sidelines over a yardage line 22 which is displaced by ten yards from the yardage line 22 from which the original measurement at position A was made. By resting his foot against the pointer leg 28, and by then erecting the rod and placing the end 12 of the rod into the ground adjacent his foot, as shown in dashed lines in FIG. 1, the operator can erect the rod 10 along the sideline at a position parallel to the line to gain point. This erect position is the position C shown in FIG. 5 and will be visible to players, officials and fans.

If the ball is advanced down field a sufficient distance that the achievement of the first down position is doubtful, the operator can move the device to position D shown in FIG. 5 and align the U-shaped bracket 14 with the yardage line 22, so that a highly accurate measurement can be made to determine whether the leading edge of the football 50 has reached the pointer leg 28, indicating that a first down has been achieved.

Referring to FIG. 6, it can be seen that if the football 50 shown in dashed lines is to be advanced in the same direction along the field as required in FIG. 5, but is closer to a yardage line 22 in the direction of the required advance of the ball, the measurement is made by placing the U-shaped bracket 14 on a line which is ahead of the football. The pointer leg 28 must then be rotated so that the measuring edge 48 faces away from the U-shaped bracket 14, thereby allowing accurate measurements to be made to the leading edge of the football 50 from this advanced yardage line 22. This ability to measure distances from either a line forward of or behind the direction of advancement of the football 50 allows the measurement of the position of a football anywhere on the field from a yardage line 22, utilizing a rod which spans only slightly more than half the distance between adjacent yardage lines 22. Thus, the rod in the preferred embodiment is approximately 3 yards in length.

Figure 7:
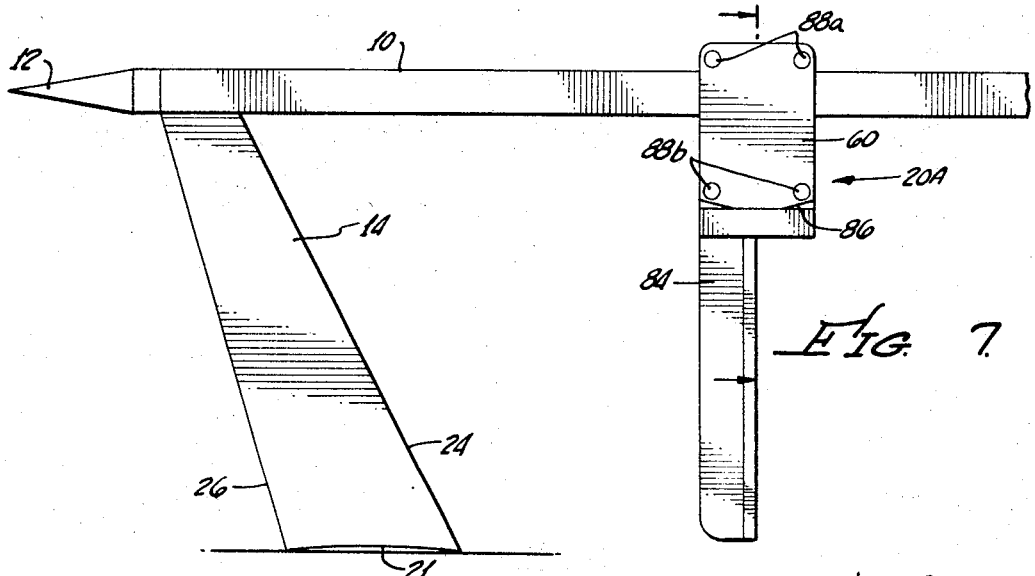
FIG. 7 is a detailed elevation view of the bracket end of the device, showing the alternate measuring pointer.
Figure 9:
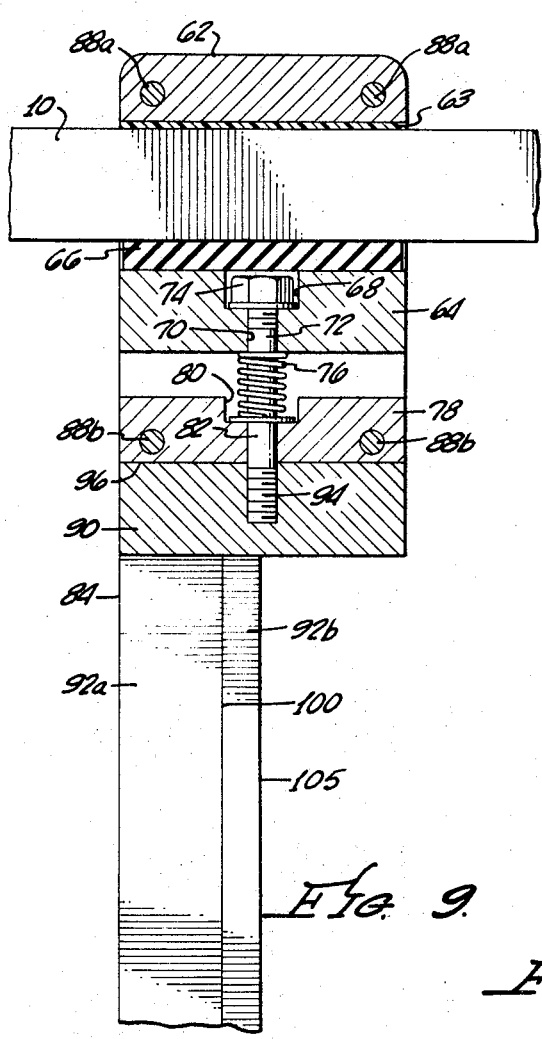
FIG. 9 is a sectional view taken along line 9—9 in FIG. 8, showing the side view of the detailed structure of the alternate measuring pointer with pointer leg in the locked position.
Figure 8:
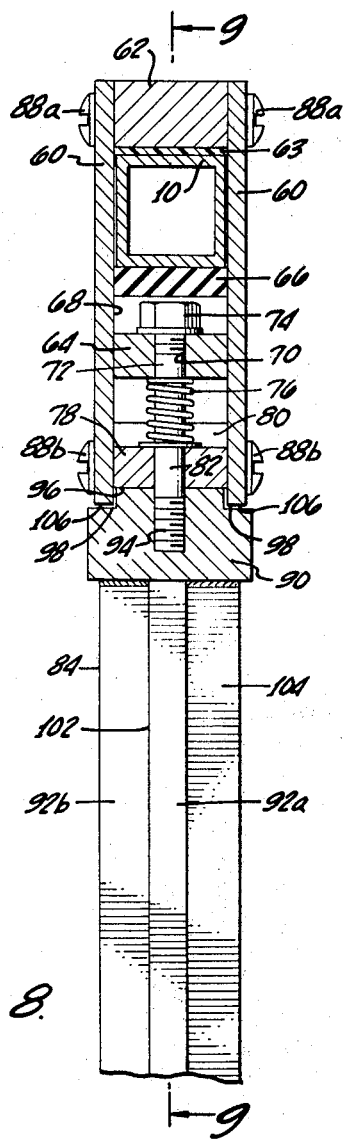
FIG. 8 is a sectional view taken along line 8—8 in FIG. 7, showing the end view of the detailed structure of the alternate measuring pointer.

FIG. 7 illustrates an alternative type of pointer 20A. A detail of this pointer is reflected in FIGS. 8 and 9. The pointer 20A slides over the rod 10 and has a rectangular configuration. The exterior of the marker is generally composed of two identical side plates 60 and a top block 62 located on top of the rod 10 between the two side plates 60. Attached to the bottom of the top block is a smooth material such as Teflon 63. Located under the rod is a compression block 64 with a rubber or high friction surface type material 66 positioned between the block 64 and the rod 10. At the center of this compression block 64 is a channeled notch 68 running between the two side plates 60. Extending down from this notch at the mid-point between the two side plates is a circular hole 70. A bolt 72 is fitted into this circular hole 70 with the head 74 of the bolt 72 located in the channeled notch 68. Superimposed on the mid-section of the bolt 72 is a spring 76 which is positioned between the compression block 64 and a lower block 78. At the center of this lower block 78 is a channeled notch 80 running between the two side plates 60. A circular hole 82 extends down through the lower block 78 from a point in the channeled notch 80 mid-way between the two side plates 60. The bolt 72 extends down through this hole 82 and is threaded into the pointer leg 84.

The side plates 60 are of a general rectangular shape except that the configuration of the bottom edge 86 reflects a slight downward protruding curve, and the side plates are secured against the top block 62 and the lower block 78 by four screws 88 in each plate 60. Two of the screws 88a secure the plate to the top block and two screws 88b secure it to the lower block. Extending from below the lower block 78 and the side plates 60 is the pointer leg 84. The pointer leg is connected to the pointer 20A by a bolt 72. The pointer leg 84 is comprised of two primary elements, consisting of a horizontal block 90 and a vertical leg 92. In the top center of the horizontal block 90 is located a hole 94 into which the bolt 72 is threaded. The horizontal block adheres to the bottom side 96 of the lower block 78. This adhesion is the result of the pressure produced by the spring 76. In the top of the horizontal block are two longitudinal notches 98 running along each side of the block 90 for receiving the downward protruding curve 86 of the side plates 60.

The vertical leg 92, extending down from the horizontal block 90, consists of two thin flat members 92a and 92b with the edge 100 of one member 92a attached to the center 102 of the flat surface 104 of the other 92b. The opposite flat surface 105 of member 92b is the measuring surface to be placed adjacent to the leading edge of the football.

The utilization of this alternate pointer 20A is the same as that for the pointer 20 reflected in FIGS. 5 and 6, for the pointer 20A is slideably mounted on the rod 10 in order to be positioned at the proper location to record the point to which the football must be advanced in order to achieve a first down, also known as the line to gain point. The measurement process has been explained previously. A discussion of the operation of the pointer 20A is necessary in order to fully appreciate its advantages. Since it is very important that the record of the distance of the football 50 from the respective yard lines 22 must be accurately maintained, so that any dispute as to the attainment of a first down does not arise, the pointer 20A must be locked firmly onto the rod 10 once the distance has been measured. Furthermore, it is necessary that the pointer 20A can be easily moved along the rod 10 when measuring the initial location of the football 50. The pointer 20A is securely locked onto the rod 10 when the pointer leg 84 is in the position shown in FIG. 9, for the spring 76 which is supported by the lower block 78 exerts a pressure on the compression block 64, causing the friction surface 66 to adhere tightly to the rod 10 and locking the pointer 20A thereon.

Figure 10:
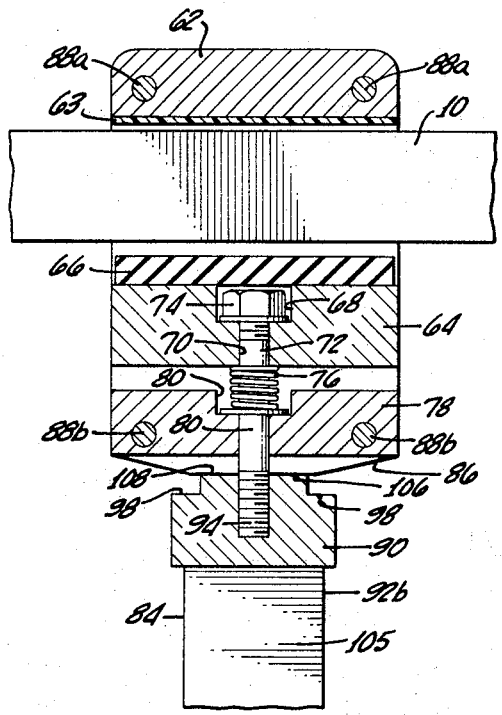
FIG. 10 is a sectional view, showing the side view of the detailed structure of the alternate measuring pointer with pointer leg in the unlocked position.

To unlock the pointer 20A in order for it to move freely along the rod 10 the pointer leg 84 must be in the position reflected in FIG. 10. To obtain this resultant position, it is necessary to first exert a force downward away from the rod 10 in an axis perpendicular to the axis of the rod, and this is usually done by grasping the pointer leg and pulling downward. Since the bolt 72 is threaded into the pointer 20A, this downward force causes the bolt 72 to be moved downward, pulling the compression block 64 away from the rod 10 and unlocking the pointer 20A from the rod 10.

To maintain an unlocked position for the pointer 20A the pointer leg 84 must be rotated 90° to the position shown in FIG. 10. Here the lower extremity 106 of the downward protruding curves 86 on the side plates 60 act as a restraining barrier to the top surface 108 of the horizontal block 90 of the pointer leg 84 to keep the spring 76 in compression and prevent the compression block 64 from pressing against the rod 10.

On the side of the pointer 20A and pointer leg 84 are indicia of some type such as different colored paint or an arrow in order to automatically reflect which direction the play of football is proceeding when the pointer leg 84 is set in the locked position (FIG. 7) and, therefore, allow the operator of the device to always know in which direction from the reference yardage line 22 to measure.

It can be seen that the position of the pointer 20 or 20A along the rod 10 maintains a record of the distance beyond a yardage line 22 to which the football must be advanced to achieve a first down. Therefore, even if the rod 10 must be moved from the sidelines to give way to players running toward the sidelines of the field, this record is not lost. The rod 10 may therefore be freely moved from the sidelines to avoid injury to players.

Likewise, the direction in which the pointer leg 28 or 84 has been rotated relative the pointer 20 or 20A respectively maintains a record of the line 22 from which measurement was made. Thus, if the football is approximately midway between two yardage lines 22 at the beginning of the play, the operator can measure from either the line 22 leading or the line 22 trailing the football. In these alternative cases, the pointer leg 28 must be rotated in opposite directions, so that the measuring edge 48 can be placed adjacent the leading edge of the football. The rotation of pointer leg 28 thus produces a record of the line used for measurement.

As an alternative to the method described in reference to FIGS. 5 and 6, it is possible to set the position of the pointer 20 along the rod 10 by aligning the pointer with the position of the downsmarker located on the sidelines to estimate the position of the football. The pointer 20 may then be adjusted by placing the rod 10 in the horizontal position at the sidelines with the bracket 14 aligned with a yardage line 22, and adjusting the pointer 20 to the location of the downsmarker.

It will be noted from FIG. 1 that, when the rod 10 is in the horizontal position, adjustment of the pointer 20 (or pointer 20A in FIG. 7) is facilitated by making the pointer 20 with its associated pointer leg 28 shorter than the bracket 14 and standard 18, thus allowing the pointer 20 to move without touching the playing field when the rod 10 is in the horizontal position.

It can be seen that if the football 50 lies partially over a yardage line 22, the U-shaped bracket 14 will straddle the ball and the pointer 20 or pointer 20A may still be moved to a position adjacent the leading edge of the football. This is accomplished, as explained in reference to FIG. 2, by offsetting the U-shaped bracket 14 at an acute angle from the rod 10, so that the measuring edge 48 of the pointer leg 28 may be aligned with the trailing edge 26 of the U-shaped bracket 14.

Figure 11:
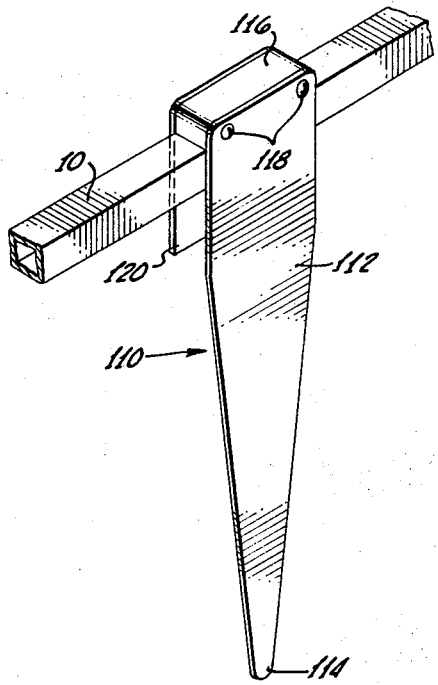
FIG. 11 is a perspective view of the line maker mounted on the device.

Another embodiment of this invention involves the ability to re-establish yard lines 22 which have been obliterated during the play of the game as a result of inclement weather. Since the basic operation of the invention relies on the utilization of the established yard lines 22 of the football field, it is imperative to be able to quickly re-establish a worn out segment of a reference yard line. This operation utilizes the structural invention as discussed previously plus the use of a line maker 110 which is reflected in FIG. 11. The main portion of the line maker 110 is a thin scribing element 112 with a wide and flat arrow shaped configuration terminating with a curved point 114. This long scribing element 112 is attached to one side of a separator block 116 by two screws 118. Attached to the opposite side of the separator block 116 by two screws is a holder element 120 which is also wide and thin, but short. The U-shaped arrangement formed by the scriber element 112, the separator block 116 and the holder element 120 fits loosely over the rod 10.

Figure 12:
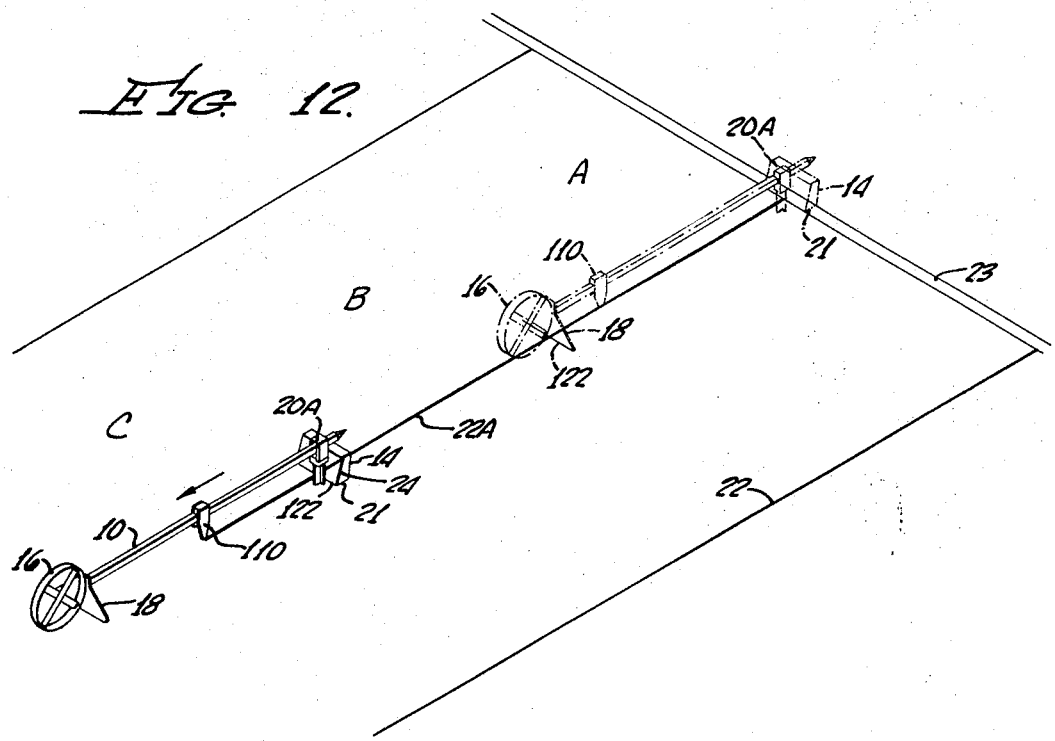
FIG. 12 is a perspective view of a football playing field, showing the device in the horizontal position perpendicular to the sideline and extending into the playing field.

With reference to FIG. 12, in order to re-establish a partially worn out yard line 22 the invention is placed horizontal and perpendicular to the sideline 23 with the U-bracket feet 21 on the sideline and with the feet straddling the yard line 22 equidistant from each foot 21 as reflected by position A. By placing the bracket 14 in such a manner the rod 10 is perpendicular to the sideline 23 and a line 22A can be quickly scribed out in the dirt or mud by manually moving the line maker 110 along the rod 10. Being a little longer than the bracket 14, the scriber element 112 is able to etch out a line 22A in the ground. If a line 22 becomes worn out nearly the entire width of the football field, the device can be used to quickly re-establish the whole line. The process begins just as stated before by placing the U-bracket 14 on the sideline 23 with the rod 10 extending horizontally out into the playing field as shown with position A in FIG. 12. The standard 18 on the other end of the rod 10 is pressed into the ground making a short line 122 perpendicular to the new yard line 22A with the same width as the U-bracket 14. The rod 10 is picked up and moved further onto the field by placing the leading edge 24 of each of the U-bracket feet 21 on the short line 122 which will maintain the rod 10 in a continued perpendicular direction from the sideline 23. The process is continued as shown by positions A through C until the operator in FIG. 12 has re-established the worn out yard line 22A as far across the field as necessary. If the worn out portion of the line is a short section in the middle of the field, the rod can be aligned between two visible segments of the line, enabling the use of the line maker to re-establish the yard line to enable the use of the yardage measuring device.

What is claimed is:

1. An apparatus to enable one individual to measure and record the necessary distance to which a football must be advanced in order to obtain a first down comprising:
   an elongate rod of a length at least one-half the distance between adjacent established yardage lines;
   a stationary marker on said rod adapted as a reference mark for alignment with one of said established yardage lines;
   a visual indicator connected on one end of said rod to show the line to gain point when said rod is vertically erected; and
   a pointer slideably mounted on said rod for accurately recording the distance between the football and the nearest said established yardage line, so that said recorded distance can be transferred to a second established yardage line which is separated from said nearest established yardage line by the distance required for a first down in order to locate the line to gain point.

2. A pointer in accordance with claim 1 comprising: means to lock said pointer onto said rod;
   a pointer leg connected to said pointer; and
   means to rotate said pointer leg about its longitudinal axis, which is perpendicular to the longitudinal axis of said rod, so that the measuring surface of said pointer leg is always facing the direction opposite to the direction of play.

3. A pointer in accordance with claim 2 wherein said means to rotate said pointer leg comprises:
   a bolt mounted in said pointer;
   a spring superimposed around said bolt; and
   a pointer leg connected to said pointer, so that by pulling said pointer leg with a force in a perpendicular direction away from said rod and rotating said pointer leg 180°, the said measuring surface can always be facing the direction opposite from which the ball is proceeding in the play of the game.

4. An improved football measuring apparatus as defined in claim 2 wherein said pointer leg includes indicia placed thereon in order to record from which direction to measure from said second established yardage line when said pointer leg is in a locked position.

5. An apparatus as defined in claim 1 wherein said stationary marker comprises a U-shaped bracket with two legs separated by a distance greater than the length of said football and extending down from said rod at an acute angle facing the other end of said rod, so that, if said football lies partially over said established yardage line, said marker can be placed on said established yardage line by straddling said football and said pointer can be slideably moved along said rod between said legs.

6. A device for measuring the distance between a football and an established yardage line on a football field comprising:
   an elongate rod;
   a stationary marker, fixed to said rod, adapted for alignment with said established yardage line; and
   a pointer, which is moveable along said rod and includes a pointer leg and means to connect said pointer leg to said pointer, so that said pointer leg may be rotated about an axis perpendicular to the longitudinal axis of said rod in order that said pointer leg will lie parallel to said rod and, thereby, not present a dangerous protrusion from said rod.

7. An improved football yardage measuring apparatus of the type wherein the line to gain point is determined by the use of an elongate rod having a stationary reference marker and a slideable pointer for recording distances, wherein the improvement comprises:
   a visual indicator which is connected to one end of said elongate rod to show the location of the line to gain point when said rod is erected vertically at said point; and
   means to automatically lock said slideable pointer onto said rod.

8. An improved football yardage measuring apparatus as defined in claim 7 wherein said means to automatically lock said slideable pointer onto said elongate rod comprises:
   a friction surface mounted within said pointer for contact with said rod;
   a pointer leg; and
   means to attach said pointer leg to said pointer, so that, when said pointer leg is in the position to record said yardage, said pointer will be automatically locked onto said rod.

9. An improved football yardage measuring apparatus as defined in claim 8 wherein said means to attach said pointer leg to said pointer comprises a bolt mounted within said pointer and connected to said pointer leg, and a spring superimposed about said bolt, so that, when said pointer leg is in position to record said yardage, said spring compresses said friction surface onto said rod and, thereby, locks said pointer onto said rod.

10. An improved football yardage measuring apparatus of the type wherein the line to gain point is determined by the use of an elongate rod having a stationary reference marker and a slideable pointer for recording distances, wherein said slideable pointer comprises:
    a bolt mounted within said pointer;
    a spring superimposed around said bolt;
    a friction surface compressed against said rod by said spring; and
    a pointer leg connected to said pointer by said bolt, so that, when said pointer leg is pulled by a face in a perpendicular direction away from said rod and rotated 90° about the axis of the direction of said force, said friction surface is released from said rod, allowing said pointer to move freely along said rod.

11. A device for measuring the distance which a football must be moved to achieve a first down, said device adapted for use on playing fields marked with yardage lines separated by said distance, comprising:
    an elongate member;
    means mounted on said elongate member for recording the distance of said football from one of said yardage lines, said elongate member and means being portable, so that they may be moved to another of said yardage lines to compare the distance of said football from said other of said yardage lines with said recorded distance; and a visual indicator, attached at one end of said elongate member, so that, when said elongate rod is placed vertically adjacent a position on said field to which said football is to be moved, its position will be highly visible.

* * * * *